United States Patent [19]
Kerscher, III et al.

[11] 3,866,166
[45] Feb. 11, 1975

[54] DIGITAL MULTIGAGE FOR MOTOR VEHICLE

[75] Inventors: William J. Kerscher, III, Flint, Mich.; Daniel A. Crawford, Boulder, Colo.

[73] Assignee: General Motors Corporation, Detroit, Mich.

[22] Filed: Apr. 9, 1974

[21] Appl. No.: 459,390

[52] U.S. Cl. .............. 340/52 F, 340/183, 340/413, 307/10 R
[51] Int. Cl. .......................................... G08b 19/00
[58] Field of Search ........ 340/52 R, 52 F, 183, 412, 340/413, 414, 415; 307/10 R

[56] References Cited
UNITED STATES PATENTS

| | | | |
|---|---|---|---|
| 3,512,405 | 5/1970 | Schlicher | 340/415 X |
| 3,541,550 | 11/1970 | Hamre | 340/413 |
| 3,648,057 | 3/1972 | Sognefest et al. | 307/10 R |
| 3,651,454 | 3/1972 | Venema et al. | 340/52 F |
| 3,683,197 | 8/1972 | Ives | 307/10 R |

*Primary Examiner*—Alvin H. Waring
*Attorney, Agent, or Firm*—Albert F. Duke

[57] ABSTRACT

A motor vehicle condition monitoring and warning system in which various conditions such as engine temperature, oil pressure, and fuel remaining are sequentially monitored for an out-of-limits condition while fuel remaining is continuously displayed and periodically updated. The status of the other condition may be displayed on a selective basis by closure of individual selectors or the status of each of the conditions may be displayed in sequence by selection of a cycle switch.

5 Claims, 5 Drawing Figures

DIGITAL MULTIGAGE FOR MOTOR VEHICLE

This invention relates to motor vehicle condition monitoring apparatus and more particularly to a digital multigage for monitoring and displaying various conditions of a motor vehicle.

Motor vehicles are presently provided with separate analog systems for monitoring engine oil pressure, engine temperature, fuel remaining, etc. Each individual system includes a display for indicating to the vehicle operator the status of the condition being monitored and/or to inform the operator if the condition is out of limits.

In accordance with the present invention a digital multigage is provided which utilizes a central unit to process and display vehicle condition information from several sources thereby minimizing the equipment necessary to monitor several functions by eliminating duplication of common components within such systems. Generally, the multigage comprises a central processing unit, a display unit, and several senders. The display unit is a conventional digital display and the senders are all variable resistance transducers which translate quantities into corresponding resistance. The processor translates the resistance presented to it by the sender into information necessary to drive the digital display. By periodically or upon command connecting the processor to different senders, various quantities may be displayed on the readout device. Using the same approach, a single warning system is incorporated within the processor to signal the fact that a quantity being monitored has approached a dangerous level.

More specifically, the central processor of the digital multigage comprises a master oscillator, display control counter, out-of-limits counter, and selection and control logic. The display control counter counts pulses from the oscillator and stores the total count. This count is then displayed at the display unit and is read as the temperature, pressure, etc., directly. The number of pulses stored in the display control counter is a function of the frequency of the oscillator and the length of time the counter is enabled. The frequency of the oscillator is controlled by a fixed resistance in the oscillator circuit. Each sender being monitored is associated with a particular resistance in the oscillator circuit which dictates a particular frequency. This serves to calibrate the processor for that with the sender. The variable resistance sender is part of an RC network which controls the time the display control counter is enabled. As the quantity being monitored changes, the resistance of the sensor changes causing the time the display control counter is enabled to vary by controlling the total count stored in the counter. The warning system operates in a similar manner to the display system. In the warning system the out-of-limits counter counts the pulses from the oscillator and the count is compared with predetermined upper or lower count limits to determine whether a condition exists requiring the attention of the operator.

A more complete understanding of the present invention may be had from the following detailed description which should be read in conjunction with the drawings in which.

Figure 3A:
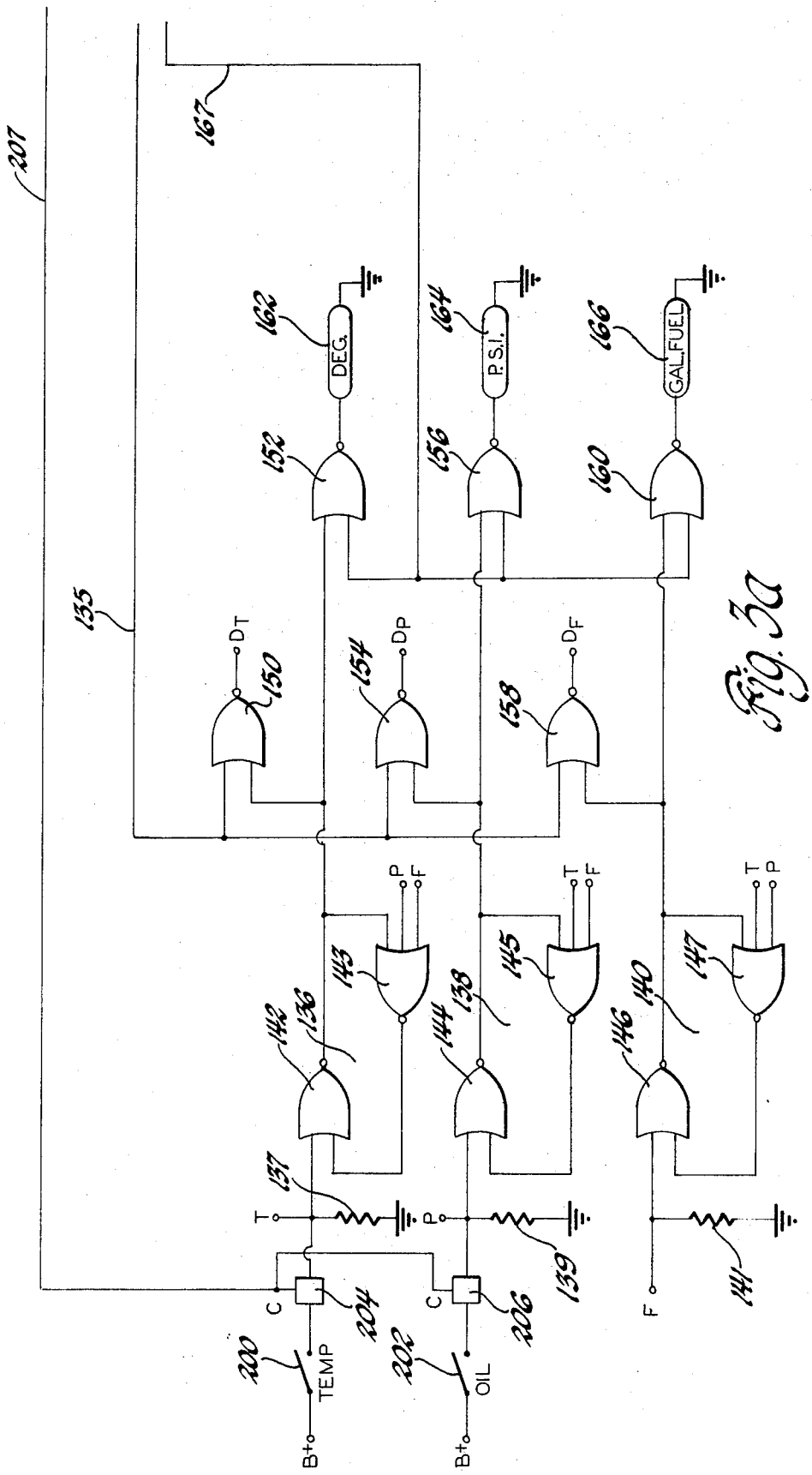
Figure 3B:
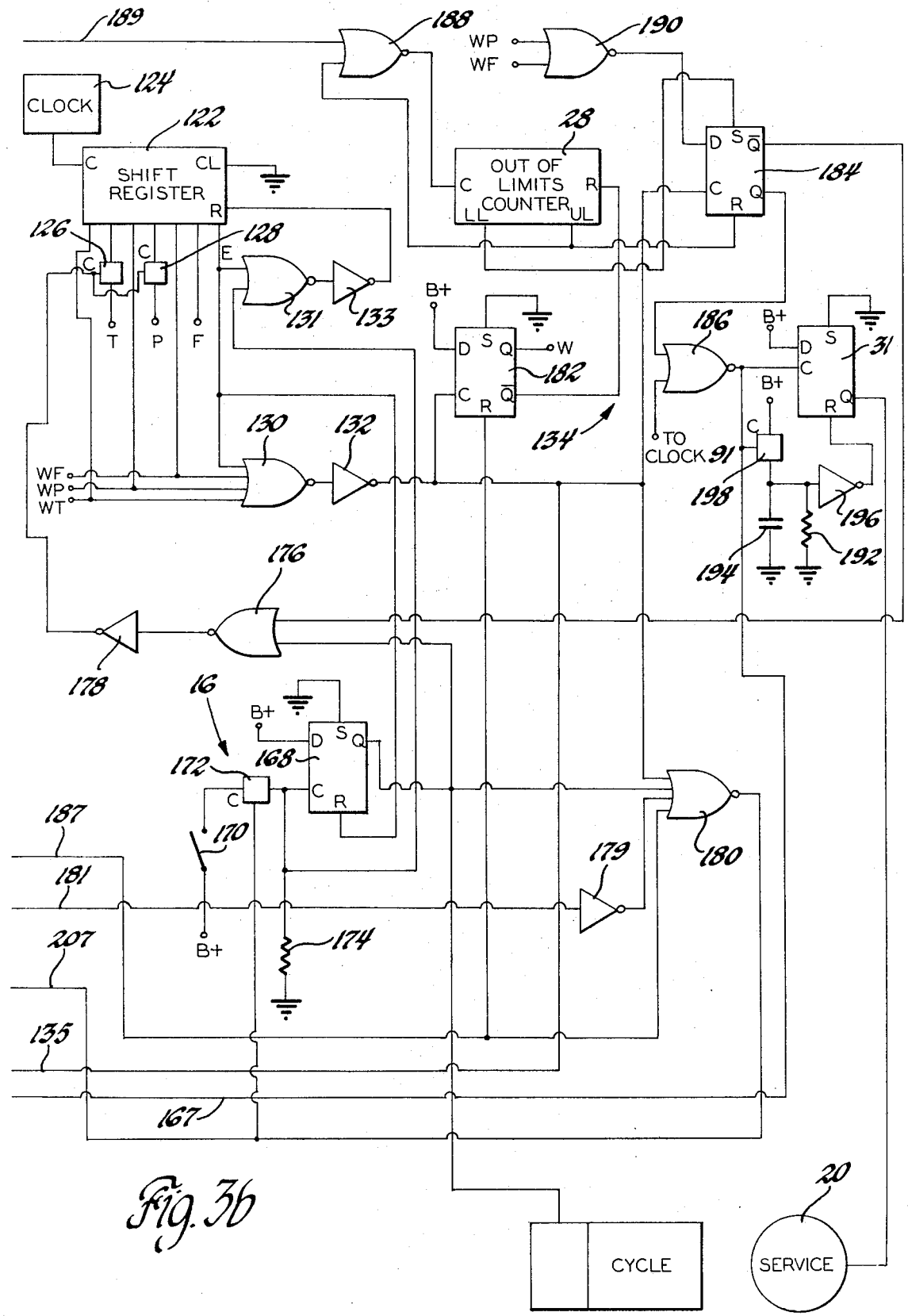

FIGS. 3, 3a, and 3b, when combined depict a detailed logic diagram of the present invention.

Figure 1:
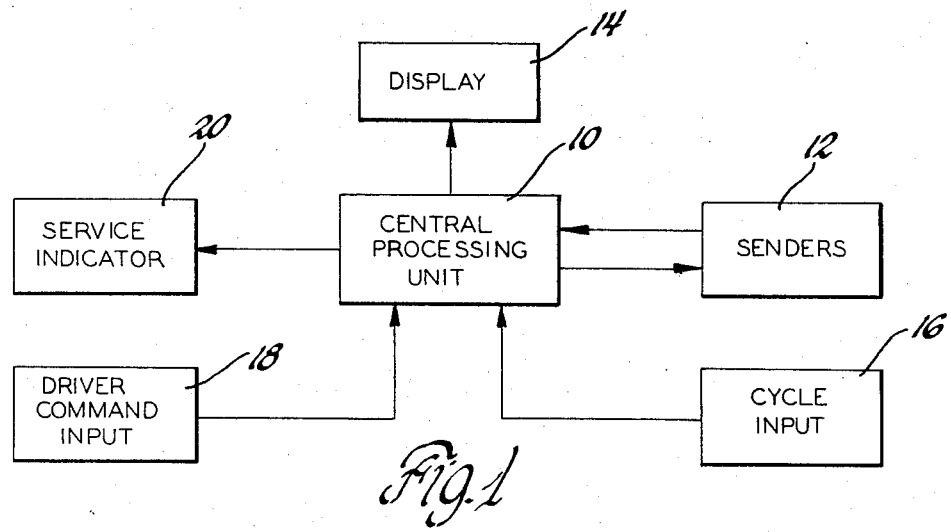
FIG. 1 is a general block diagram of the present invention.

Referring now to FIG. 1, the digital multigage of the present invention includes a central processing unit generally designated 10 which selectively addresses one of a plurality of senders generally designated 12 and receives status information relative to the condition being monitored. The central processing unit 10 drives a display generally designated 14 which normally displays the fuel remaining but may be commanded to cycle through and display the various conditions being monitored by way of an operator-actuable cycle input generally designated 16. The fuel remaining is automatically updated periodically. The unit 10 may also be commanded by the driver to display on a driver select basis the remaining conditions which are being monitored by way of driver command inputs generally designated 18. The unit 10 continuously monitors the various sender inputs to determine if any of the conditions of the vehicle are out of predefined limits, and if so, energizes a service indicator generally designated 20.

Figure 2:
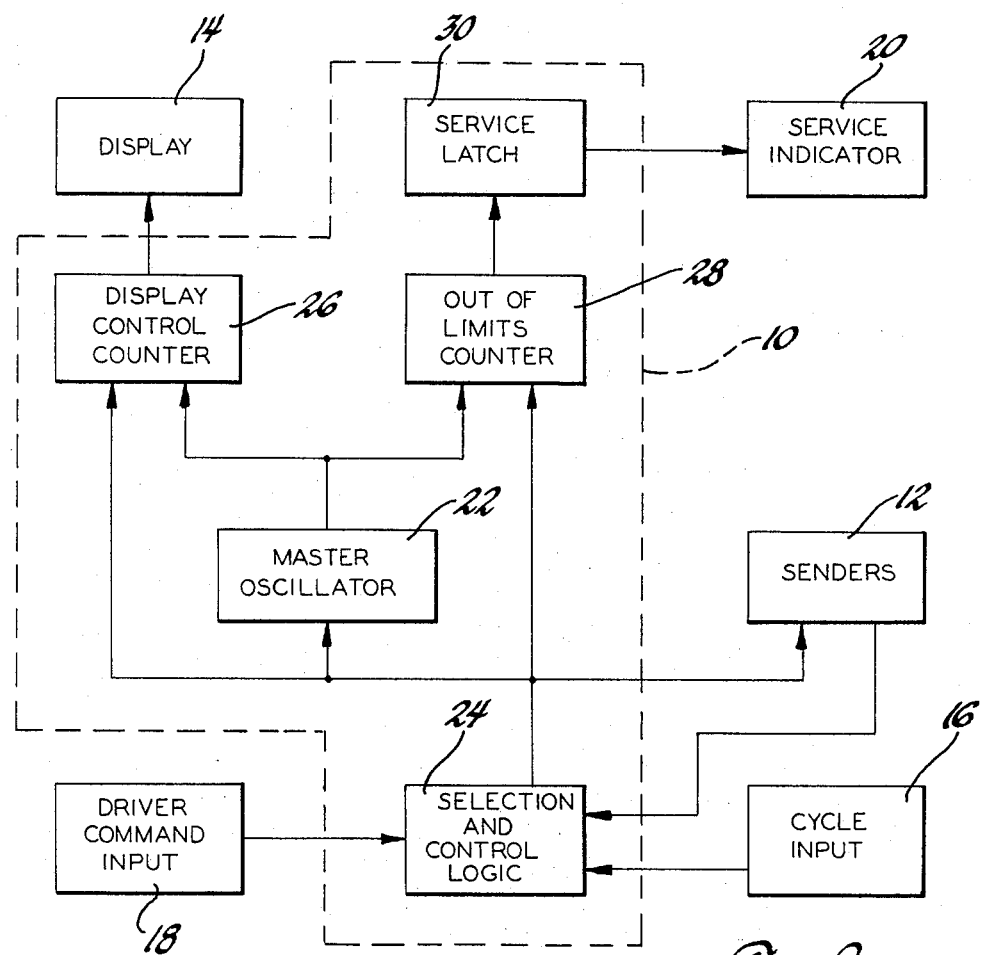
FIG. 2 is a more detailed block diagram of the present invention.
Figure 5:
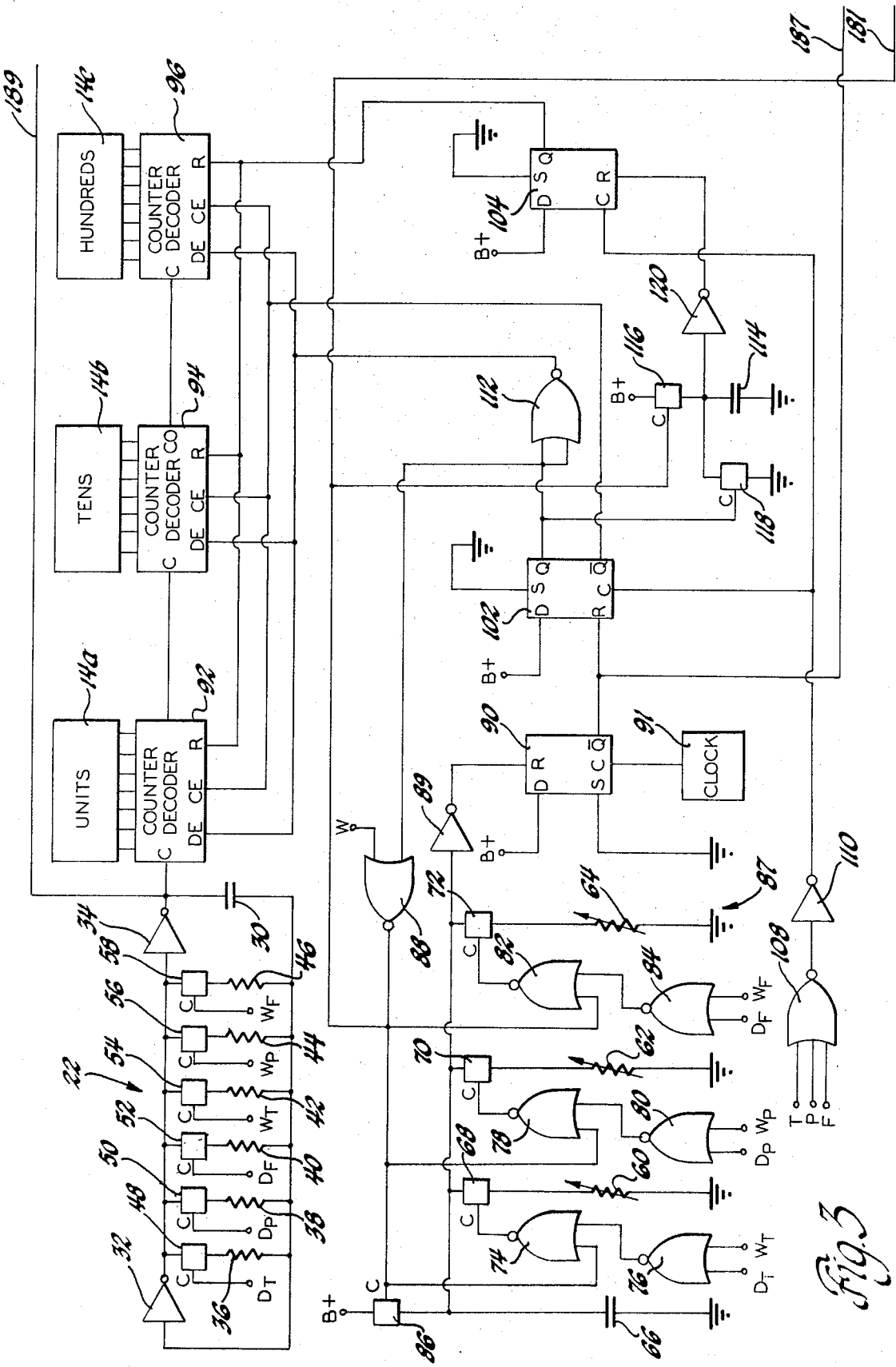

Referring now to FIG. 2, the central processing unit 10 includes a master oscillator generally designated 22 which produces a pulsating output signal at one of several frequencies depending upon the sender selected by selection and control logic generally designated 24. The particular frequency selected is applied to a display control counter generally designated 26 and an out-of-limits counter 28 which are selectively enabled by the logic 24. The counter 28 controls a service latch 30 which in turn controls the service indicator 20.

Referring now to FIGS. 3, 3a, and 3b, the master oscillator 22 comprises a timing capacitor 30, inverters 32 and 34, and calibration resistors 36–46. The resistors 36–46 are selectively connected in the oscillator circuit by means of transmission gates 48–58 under the control of inputs designated $D_T$, $D_P$, $D_F$, and $W_T$, $W_P$, and $W_F$. The three resistors 36, 38, and 40 are under the control of inputs $D_T$, $D_P$, and $D_F$ and are employed to calibrate the display system for engine temperature, oil pressure, and fuel remaining respectively. The resistors 42, 44, and 46 are under the control of the inputs $W_T$, $W_P$, and $W_F$ respectively, and are employed to calibrate the warning system for engine temperature, oil pressure, and fuel remaining, respectively. The gates 48–58 are conventional switching elements which close in response to the application of a positive potential at the control input designated C.

The senders 12 may comprise any number of vehicle condition sensors but for purposes of explaining the invention, three sensors are shown, namely, an engine temperature sensor 60, an engine oil pressure sensor 62, and a fuel sensor 64. The sensors 60, 62, and 64 are connected in parallel with a capacitor 66 through transmission gates 68, 70, and 72. The transmission gates 68, 70, and 72 are controlled from select logic comprising NOR gates 74, 76; 78, 80; and 82, 84. The capacitor 66 is charged from B+ through a transmission gate 86 which is controlled from the output of a NOR gate 88 which also provides one input to each of the gates 74, 78, and 82. When the output of the gate 88 is high, the capacitor 66 is charged from B+ through the gate 86. Also, the gates 74, 78, and 82 are disabled so that the control input to the gates 68, 70, and 72 are low. When the output of the gate 88 goes low the gate 86 opens and the gates 74, 78, and 82 are enabled so that a high input to one of the gates 76, 80, or 84 will close the corresponding gates 68, 70, or 72 and permit the capacitor 66 to be discharged through the corresponding sensor. When the capacitor 66 is discharged below the threshold of an inverter 89, a flip-flop 90 is reset. The flip-flop 90 is clocked from a source 91 operating at a frequency of, for example, 128 pulses per minute so that its $\overline{Q}$ output is normally low. The flip-flop 90 and the RC network formed by the capacitor 66 and one of the sensors 60, 62, or 64 form a timer generally designated 87 which establishes a time interval related to the status of the sensor selected.

The output of the oscillator 22 is applied to the clock input of a counter/decoder 92 which when enabled will count the pulses generated by the oscillator 22 and drive a UNITS display 14a. The carry output of the counter/decoder 92 is applied to the clock input of a counter/decoder 94 which drives a TENS display 14b. Likewise, the carry output of the counter/decoder 94 is applied to the clock input of a counter/decoder 96 which drives a HUNDREDS display 14c. The counter/decoders 92, 94, and 96 are conventional elements which accumulate the pulses generated by the oscillator 22 during the period that the counter/decoders are enabled and decode the number of pulses accumulated to drive the displays 14a, 14b, and 14c to display the numerical equivalent of the accumulated pulses.

The timer 87 resets control logic comprising flip-flop 102 and 104 which controls the CE (Clock Enable), DE (Display Enable), and R (Reset) inputs to the counter/decoders 92, 94, and 96. The D inputs to the flip-flops 102 and 104 are connected with B+. The flip-flops 102 and 104 are clocked from inputs designated T, P, or F through a NOR gate 108 and inverter 110. The Q output of the flip-flop 102 provides one input to the NOR gate 88 and is connected with the DE inputs of the counter/decoders 92, 94, and 96 through an inverter formed by NOR gate 112. The $\overline{Q}$ output of the flip-flop 102 is connected with the CE inputs of the counter/decoders 92, 94, and 96. Each time the flip-flop 102 is clocked, its Q output is driven high to blank the display 14 and open the transmission gate 86 and permit the capacitor 66 to discharge. At the same time the $\overline{Q}$ output of the flip-flop 102 is driven low to enable the CE input of the counter/decoders 92, 94, and 96 to permit accumulation of pulses from the oscillator 22. Clocking of the flip-flop 104 resets each of the counter/decoders 92, 94, and 96. The reset on the counter/decoders 92, 94, and 96 is almost immediately released by resetting the flip-flop 104 from a capacitor 114. The capacitor 114 is charged from B+ through a transmission gate 116 having its control element connected to the output of the gate 88. The capacitor 114 is discharged through a transmission gate 118 having its control input connected with the Q output of the flip-flop 102. The capacitor 114 will normally be charged when the flip-flops 102 and 104 are clocked so that the resulting high at the Q output of the flip-flop 104 resets the counter/decoders 92, 94, and 96 but the high at the Q output of the flip-flop 102 closes the gate 118 and the subsequent discharge of the capacitor 114 resets the flip-flop 104 through an inverter 120 to release the reset input to the counter/decoders 92, 94, and 96.

Selection of the appropriate sensor and the corresponding calibration resistor may be accomplished sequentially on a continuous time division basis for warning purposes, or on a single cycle basis upon command from the vehicle operator or on an individual selection basis by the operator. Preferably, the remaining fuel is continuously displayed to the operator in the absence of a cycle command. Selection of the appropriate sensor and calibration resistor is accomplished on a continuous basis from a shift register 122 which is clocked from a source 124 at an appropriate frequency such as 32 pulses per minute.

The register 122 is normally clocked through a sequence which raises the output designated $W_T$, $W_P$, $W_F$, F, and E in sequence. The designated T and P outputs may be interspersed between the $W_T$, $W_P$, and $W_F$ outputs by closing transmission gates 126 and 128 which are controlled by the cycle input 16 which will be described more fully hereinafter. $W_F$, $W_P$, and $W_T$ outputs as well as the E output are applied through a NOR gate 130 and inverter 132 to warning control circuitry generally designated 134 which will also be described more fully hereinafter. The E output of the register 122 is also applied to the reset input through a NOR gate 131 and inverter 133. The T, P, and F outputs of register 122 are applied to latch circuits 136, 138, and 140 comprising NOR gates 142, 143; 144, 145; and 146, 147 respectively, and pulldown resistors 137, 139, and 141 respectively. The latch 136 is set when T goes high and is reset through gate 143 when P or F goes high. The latch 138 is set when P goes high and is reset from gate 145 when T or F goes high. The latch 140 is set when F goes high and is reset from gate 147 when T or P goes high. The output of the latches 136, 138, and 140 provide one input to NOR gates 150, 152; 154, 156; and 158, 160. The outputs of the gates 150, 154, and 156 are $D_T$, $D_P$, and $D_F$. The other input to the gates 150, 154, and 158 is from the warning control circuitry 134, through conductor 135, and disables these gates under conditions which will be explained hereinafter. The output of the gates 152, 156, and 160 drive telltale indicator 162, 164, and 166 which may illuminate appropriate legends such as DEG, PSI, and GAL FUEL respectively, for correlation purposes with the number being displayed on the display 14. The other input to gates 152, 156, and 160 are from the warning control circuitry 134 through conductor 167, and disables these gates under conditions which will be described more fully hereinafter.

The cycle input 16 includes a D type flip-flop 168 which is clocked from a momentary closure cycle switch 170 which applies B+ to a transmission gate 172. The clock input of the flip-flop 168 is connected to ground through a pulldown resistor 174 and its D input is connected to B+. The Q output of the flip-flop 168 is connected through a NOR gate 176 and an inverter 178 to the control input of the gates 126 and 128. The transmission gate 172 is controlled from the output of a NOR gate 180. The gate 180 has inputs from the inverter 132, the Q output of flip-flop 168, the $\overline{Q}$ output of flip-flop 90, and from the gate 88 through an inverter 179 via conductor 181. The output of gate 180 is, therefore, low during the times that $W_T$, $W_P$, $W_F$, and F are high. Closure of the cycle switch 170 by the operator while the output of the gate 180 is high will drive the Q output of the flip-flop 168 high and close the gates 126 and 128. Closure of the cycle switch 170 also resets the register 122 through gate 131 and inverter 133. The Q output of the flip-flop 168 is driven low upon reset from the E output of the register 122.

The $W_F$, $W_P$, and $W_T$ outputs of the register 122 are applied to the gates 76, 80, and 84 to select the appropriate sensors 60, 62, or 64 respectively and are also applied to the transmission gates 54, 56, and 58 to select the appropriate calibration resistor 42, 44, or 46. The $W_F$, $W_P$, and $W_T$ outputs as well as the E output of the register 122 are applied to the clock input of flip-flops 182, 184, and as one input to a NOR gate 186 as well as to the gate 180 and gates 150, 154, and 156 through gate 130 and inverter 132. The D input of the flip-flop 182 is connected with B+ and its Q output designated W is connected with one input to the gate 88. The flip-flop 182 is reset from the flip-flop 90 through conductor 187. When the flip-flop 182 is reset its $\overline{Q}$ output is driven high to reset the out-of-limits counter 28. The counter 28 is a conventional binary counter which is clocked via conductor 189 from the oscillator 22 through a NOR gate 188. The counter 28 sets the flip-flop 184 when the number of pulses from the oscillator 22 exceeds some lower limit as established by the output designated LL and resets the flip-flop 184 when the number of pulses from the oscillator 22 exceeds some upper limit designated by the output UL. The output UL is also applied as one input to the gate 188 to prevent further clocking of the counter 28 when the upper limit is reached. The lower limit is associated with engine oil pressure and fuel level whereas the upper limit is associated with engine temperature. The $W_P$ and $W_T$ outputs of the register 122 are applied through a NOR gate 190 to the D input of the flip-flop 184. The service latch 31 has its D input connected to B+ and is clocked from the gate 186 having inputs connected with the Q output of the flip-flop 184 and the clock source 91. If engine oil pressure or fuel level is above the lower limit the flip-flop 184 will be set to disable the gate 186 and prevent clocking of the flip-flop 31. If the engine temperature is below the upper limit the gate 186 will remain disabled. If any conditions are out of limit the gate 186 will be enabled and the flip-flip 31 will be clocked driving its Q output high to energize the service indicator 20. A reset network comprising resistor 192, capacitor 194, inverter 196, and transmission gate 198 are provided for resetting the service latch 31 after a time delay of about 30 seconds has elapsed from the time the out-of-limits condition has been corrected. When an out-of-limits condition occurs, the high output of the gate 186 closes the transmission gate 198 to charge the capacitor 194. Since the out-of-limits condition will be periodically detected, the capacitor 194 does not have an opportunity to discharge below the threshold level of the inverter 196 until after the out-of-limits condition has been corrected. Also, the periodic high output from the gate 186 periodically disables the gates 152, 156, and 160 causing the indicators 162, 164, and 166 to flash anytime the gates 152, 156, and 160 are enabled by a low output from the latches 136, 138 and 140 respectively. Since the fuel indicator 166 is normally illuminated it will be deenergized at the rate of 128 times per minute from the clock 91 through the gate 186. The indicators 162 and 164 are normally deenergized unless the cycle switch 170 is closed. Should the service indicator 20 become energized the operator may close the cycle switch 170 and the indicators 162 or 164 will flash to inform him of the condition which is out of limits and the actual temperature or pressure will be displayed on the display 14.

The operator may select for display on an individual basis, either engine temperature or oil pressure by closing momentary contact pushbutton 200 or 202, respectively, designated TEMP and OIL. The switches 200 and 202 apply B+ to the latches 136 and 138 through transmission gates 204 and 206, respectively. The gates 204 and 206 are controlled from the output of the gate 180 through conductor 207. The gates 204 and 206 are closed from the gate 180 during the time interval assigned to the T and P outputs of the register 122 and are otherwise open. Once the latches 136 or 138 are set from the switches 200 or 202, the latch is reset from the F output of the register 122. Closure of the switches 200 or 204 also drives the T or P inputs to the gate 108 high to clock the flip-flops 102 and 104.

The operation of the multigage in its normal warning mode is as follows. When the $W_T$ output of the register 122 goes high the calibrating resistor 42 in the oscillator circuit 22 is selected so that the oscillator operates at a frequency such that as long as the engine temperature is below a predefined upper limit the UL output of the counter 28 will not be activated. The $W_T$ input to the gate 76 lowers the output of the gate 76. The flip-flop 182 is clocked by $W_T$ causing its $\overline{Q}$ output to go low and release the reset on the counter 28. The Q output of the flip-flop 182 goes high which lowers the output of gate 88 thereby raising the output of gate 74. The gate 86 is turned off and gate 68 is turned on so that the capacitor 66 can discharge through the engine temperature sensor 60. $W_T$ also clocks the flip-flop 184 driving its Q output low since the D input to the flip-flop 184 is held low by $W_T$ through the gate 190. The counter 28 begins counting pulses from the oscillator 22 through the gate 188. The LL output of the counter 28 will be driven high even at the lowest engine temperature so that the flip-flops 184 will be set causing its Q output to go high. When the capacitor 66 discharges below the threshold of the inverter 106 the flip-flop 90 is reset which resets the flip-flops 102 and 182 which in turn resets the counter 28. With both flip-flops 102 and 182 reset, both inputs to the gate 88 are low and the output of the gate 88 switches high to turn the gate 86 on and permit charging of the capacitor 66. If the engine temperature is below the predefined upper temperature limit the counter 28 will be reset before the UL output is driven high. The gate 186 will remain disabled by the Q output of the flip-flop 184 when $W_T$ goes low. On the other hand if the UL output of the counter 28 is driven high before the counter 28 is reset indicative of the engine temperature being too high, the flip-flop 184 will be reset driving its Q output low. During the interval after $W_T$ goes low and before $W_P$ goes high the output of the gate 186 will be periodically driven high by the clock 91. The high output of the gate 186 maintains capacitor 194 in a charged state and clocks the flip-flop 31 to energize the service indicator 20.

While $W_T$ is high the output of the gates 150, 154, and 158 are driven low through gate 130 and inverter 132 to insure that only the engine temperature sensor 60 is selected while $W_T$ is high. Also, while $W_T$ is high the gates 172, 204, and 206 are opened from the gate 130, inverter 132 and gate 180 to effectively disable the switches 170, 200, and 202 during the time that $W_T$ is high.

When $W_P$ or $W_F$ are high the operation of the system in a warning mode is substantially the same as that when $W_T$ is high except that the oil pressure sensor 62 or the fuel sensor 64 are selected and the resistors 44 and 46 are selected. However, when $W_P$ or $W_F$ are high the output of gate 190 is low so that clocking of the flip-flop 184 causes its Q output to go low. Consequently, unless the LL output of the counter 28 is driven high to set the flip-flop 184 before the counter 28 is reset, the latch 30 will be clocked at the conclusion of the $W_P$ or $W_F$ interval, respectively.

As previously indicated, the system of the present invention operates in a display mode which normally displays the remaining fuel. This results from the fact that as soon as the register 122 raises the F output, the latch 140 is set driving $D_F$ high to select the fuel sensor 64 and the resistor 40. The F output of the register 122 also clocks the flip-flops 102 and 104 through the gate 108 and inverter 110 to reset the counter/decoders 92, 94, and 96. The reset is immediately released by discharging capacitor 114 through the gate 118. The clocking of the flip-flop 102 lowers the output of the gate 88 to turn off the gate 86. The clock input to the counter/decoders 92, 94, and 96 is enabled so that as capacitor 66 discharges through the fuel sensor 64 the count is accumulated in the counter/decoders 92, 94, and 96. When the capacitor 66 discharges below the threshold level of the inverter 89 the flip-flop 90 is reset thereby resetting the flip-flop 102 to enable the display 14 and disable the clock input to the counter/decoders 92, 94, and 96. The display 14 will remain enabled to display the fuel remaining as determined by the last sampling of the fuel sensor 64 until the flip-flop 102 is again clocked. This will occur each time the F output of the register 122 is driven high. The fuel remaining display is thus updated each cycle of the register 122. If the cycle switch 170 is closed during any of the time intervals associated with the T, P, or F outputs of the register 122, the output of the gate 180 will be high so that the flip-flop 168 will be clocked to close the gates 126 and 128. At the same time, closure of the switch 170 resets the register 122 through the gates 131 and 133. The register is then clocked so that the outputs $W_T$, T, $W_P$, P, $W_F$, F, and E are raised in sequence. The engine temperature, oil pressure, and fuel remaining are thus monitored and displayed in sequence. When the E output of the register 122 goes high the flip-flop 168 is reset to thereby open the gates 126 and 128. Instead of raising the T and P outputs through operation of the cycle switch 170 the operator may select display of engine temperature or oil pressure by closing the switches 200 or 202. This will raise the T or P inputs to the gate 108 and clock the flip-flops 102 and 104 to cause engine temperature or oil pressure to be displayed.

Having thus described our invention what we claim is:

1. Motor vehicle condition monitoring apparatus comprising:
    timer means, including a plurality of selectively connectable variable resistance sensor means, for establishing when enabled a time interval related to the status of the sensor selected,
    oscillator means, including a plurality of selectively connectable calibrating resistor means, for producing an output signal at a frequency dependent on the calibrating resistor means selected, each calibrating resistor means being associated with a sensor means so that a particular calibrating resistor means is selected in conjunction with a particular sensor means,
    counter means adapted when enabled to be clocked from said oscillator means,
    display means adapted when enabled to display the digital value of the count stored in said counter means,
    counter and display control means responsive to selection of each of said sensor means for enabling said timer means and said counter means and for disabling said display means, said control means responsive to the termination of said time interval for enabling said display means and for disabling said counter means,
    automatic selection means for periodically selecting one of said sensor means and the associated frequency output of said oscillator means,
    cycle selection means for sequentially selecting each of said sensor means and the associated frequency output of said oscillator means,
    individual selection means for selecting other than said one of said sensor means and the associated frequency output of said oscillator means.

2. Motor vehicle condition monitoring apparatus comprising:
    timer means, including a plurality of selectively connectable sensor means for establishing when enabled a time interval related to the status of the sensor selected, said sensor means including an engine temperature sensor, an engine oil pressure sensor, and a fuel sensor,
    oscillator means, including a plurality of selectively connectable calibrating resistor means, for producing an output signal at a frequency dependent upon the calibrating resistor means selected, each calibrating resistor means being associated with a sensor means so that a particular calibrating resistor means is selected in conjunction with a particular sensor means,
    counter means adapted when enabled to be clocked from said oscillator means,
    display means adapted when enabled to display the digital value of the count stored in said counter means,
    counter and display control means responsive to selection of each of said sensor means for enabling said timer means and said counter means and for disabling said display means, said control means responsive to the termination of said time interval for enabling said display means and for disabling said counter means,
    automatic selection means for periodically selecting said fuel sensor and the associated frequency output of said oscillator means,
    cycle selection means for sequentially selecting each of said sensor means and the associated frequency output of said oscillator means,
    individual selection means for selecting said engine temperature sensor or said engine oil pressure sensor and the associated frequency output of said oscillator means.

3. In a motor vehicle provided with a source of direct current, a plurality of variable resistance sensor means including an engine temperature sensor, an engine oil pressure sensor and a fuel sensor, a digital multigage comprising a capacitor, means normally connecting said capacitor to said source to maintain said capacitor in a charged state, operator actuable manual selector means for selecting display of engine temperature or engine oil pressure, automatic selector means for periodically selecting display of fuel remaining, oscillator means for producing a pulsating output at one of three predetermined frequencies in response to selection to display engine temperature, engine oil pressure or fuel remaining respectively, logic means responsive to a manual or automatic selection for discharging said capacitor through the sensor corresponding to the display selected to establish a time interval related to the value of the resistance of the sensor, counter means for accumulating the pulses produced by said oscillator during said time interval and display means for displaying the digital value corresponding to the output of said counter means at the end of said time interval and until a manual or automatic selection is subsequently made.

4. Motor vehicle condition warning apparatus comprising:

timer means including a plurality of selectively connectable variable resistance sensor means, for establishing when enabled, a time interval related to the status of the sensors selected, oscillator means including a plurality of selectively connectable calibrating resistor means for producing an output signal at a frequency dependent of the calibrating resistor means selected, each calibrating resistor means being associated with a sensor means so that a particular calibrating resistor means is selected in conjunction with a particular sensor means, counter means adapted when enabled to be clocked from said oscillator means, indicator means, counter control means responsive to selection of each of said sensor means for enabling said counter means, said control means responsive to termination of said time interval for disabling said counter means, selector means for periodically selecting each of said sensor means and the associated frequency output of said oscillator means, means for comparing the counts accumulated in said counter means with a predetermined upper or lower limit and for energizing said indicator means when the count accumulated by said counter means is above said upper limit or below said lower limit, latch means responsive to the output of said comparator means for energizing said indicator means.

5. In a motor vehicle provided with a plurality of variable resistance sensor means including an engine temperature sensor, an engine oil pressure sensor, and a fuel sensor, a condition monitoring system comprising:

timer means including said sensors for establishing a time interval related to the status of the sensor selected, oscillator means including a plurality of selectively connectable calibrating resistor means for producing first, second, and third output signals at predetermined frequencies dependent on the sensor selected, first counter means adapted when enabled to be clocked from said oscillator means, display means adapted when enabled to display the digital value of the count stored in said first counter means, selection means for sequentially selecting each of said sensor means, first control means responsive to selection of said fuel sensor means for enabling said timer means and said counter means and for displaying said display means, said first control means responsive to the termination of said time interval for enabling said display means and for disabling said counter means, out-of-limits counter means responsive to the output of said counter means, second control means responsive to the selection of said engine temperature sensor or said oil pressure sensor for enabling said out-of-limits counter means, warning means, latch means for controlling the energization of said warning means, third control means responsive to said out-of-limits counter means reaching an upper limit during selection of said engine temperature sensor of the failure of said counter means to reach a predetermined lower limit during selection of said engine oil pressure for setting said latch means.

* * * * *